United States Patent
van Splunter et al.

(10) Patent No.: US 11,036,657 B2
(45) Date of Patent: Jun. 15, 2021

(54) WRITING BLOCK FOR A RECEIVER

(71) Applicant: NXP B.V., Eindhoven (NL)

(72) Inventors: Marinus van Splunter, Helmond (NL); Arie Koppelaar, Giessen (NL); Artur Burchard, Eindhoven (NL)

(73) Assignee: NXP B.V., Eindhoven (NL)

( * ) Notice: Subject to any disclaimer, the term of this patent is extended or adjusted under 35 U.S.C. 154(b) by 104 days.

(21) Appl. No.: 16/401,609

(22) Filed: May 2, 2019

(65) Prior Publication Data

US 2019/0347221 A1 Nov. 14, 2019

(30) Foreign Application Priority Data

May 9, 2018 (EP) .................... 18171603

(51) Int. Cl.
*G06F 13/16* (2006.01)
(52) U.S. Cl.
CPC ...... *G06F 13/1673* (2013.01); *G06F 13/1694* (2013.01)
(58) Field of Classification Search
CPC .................................................. G06F 13/1673
See application file for complete search history.

(56) References Cited

U.S. PATENT DOCUMENTS

| 6,314,478 | B1 | 11/2001 | Etcheverry |
| 10,212,094 | B2* | 2/2019 | Kessel ................... H04H 40/18 |
| 2001/0011323 | A1* | 8/2001 | Ohta ..................... G06F 3/0659 |
| | | | 711/112 |
| 2003/0007396 | A1 | 1/2003 | Walker et al. |
| 2006/0093331 | A1 | 5/2006 | Huang et al. |
| 2010/0005199 | A1 | 1/2010 | Gadgil |

* cited by examiner

*Primary Examiner* — Douglas King

(57) ABSTRACT

A writing-block for writing data to a memory-buffer, wherein the memory-buffer comprises an ordered sequence of elements and the writing-block is configured to: receive an input-data-stream; and write the input-data-stream to the memory-buffer in a successive manner from a first-element of the ordered sequence to a predetermined-element of the ordered sequence. Following writing to the predetermined-element the writing-block is configured to continue to write the input-data-stream to the memory-buffer in a successive manner restarting at the first-element. In response to writing the predetermined-element, the writing-block is configured to also continue to write the input-data-stream to the memory-buffer in a successive manner from an element immediately following the predetermined element until a second predetermined-element of the memory-buffer.

20 Claims, 2 Drawing Sheets

Buffer start address

WRITING BLOCK FOR A RECEIVER

CROSS-REFERENCE TO RELATED APPLICATIONS

This application claims the priority under 35 U.S.C. § 119 of European Patent application no. 18171603.6, filed on 9 May 2018, the contents of which are incorporated by reference herein.

The present disclosure relates to a receiver and in particular to how a receiver writes an input-data-stream to a memory-buffer.

According to a first aspect of the present disclosure there is provided a writing-block for writing data to a memory-buffer, wherein the memory-buffer comprises an ordered sequence of elements and the writing-block is configured to:
  receive an input-data-stream; and
  write the input-data-stream to the memory-buffer in a successive manner from a first-element of the ordered sequence to a predetermined-element of the ordered sequence, wherein following writing to the predetermined-element the writing-block is configured to continue to write the input-data-stream to the memory-buffer in a successive manner restarting at the first-element;
  wherein in response to writing the predetermined-element, the writing-block is configured to also continue to write the input-data-stream to the memory-buffer in a successive manner from an element immediately following the predetermined element until a second predetermined-element of the memory-buffer.

In one or more embodiments, following writing to the predetermined-element, the writing-block may be configured to write the input-data-stream to both the first-element and the element immediately following the predetermined element in a duplicated-writing-process until the second-predetermined-element of the memory-buffer is written.

In one or more embodiments, following writing to the second-predetermined-element, the writing-block may be configured to continue to write the input-data-stream to only a memory-buffer-core, defined as the elements between the first-element and the predetermined element, until it writes to the predetermined-element again.

In one or more embodiments a memory-buffer-supplement defined as the elements between the element immediately following the predetermined element and the second predetermined-element may be larger than or equal to a symbol-size of one input-data-symbol of the input-data-stream.

In one or more embodiments each input-data-symbol of the input-data-stream may be stored in a continuous piece of the memory-buffer.

According to a further aspect of the present disclosure there is provided a system comprising any writing-block disclosed herein and the memory-buffer.

In one or more embodiments the system may further comprise a reading-block configured to read the input-data-symbols of the input-data-stream from the memory-buffer.

In one or more embodiments the reading-block may be configured to read input-data-symbols of the input-data-stream from a continuous piece of the memory-buffer.

In one or more embodiments the reading-block may be further configured to:
  detect the start of a new-input-data-symbol in the memory-buffer-supplement at a detected-boundary-element; and
  locate another copy of the new-input-data-symbol at a wrap-around-element in the memory-buffer-core.

In one or more embodiments the reading-block may be configured to determine the number of elements between the first-element and the wrap-around-element as equal to the number of elements between the predetermined-element and the detected-boundary-element.

In one or more embodiments the reading-block can comprise digital signal processing code. The reading-block may be configured to process the input-data-symbols of the input-data-stream directly in the memory-buffer.

In one or more embodiments the processing code may comprise a fast Fourier transform routine.

According to a further aspect of the present disclosure there is provided a software defined radio system comprising any of the writing-blocks disclosed herein or any of the systems disclosed herein.

According to a further aspect of the present disclosure there is provided a method for writing data to a memory-buffer comprising an ordered sequence of elements, the method comprising the steps of:
  receiving an input-data-stream;
  writing the input-data-stream to the memory-buffer in a successive manner from a first-element of the ordered sequence to a predetermined-element of the ordered sequence;
  following writing to the predetermined-element, writing the input-data-stream to the memory-buffer in a successive manner restarting at the first-element; and
  in response to writing the predetermined-element, writing the input-data-stream to the memory-buffer in a successive manner from an element immediately following the predetermined element until a second predetermined-element of the memory-buffer.

According to a further aspect of the disclosure there is provided a computer program, which when run on a computer, causes the computer to perform any method disclosed herein, or to configure any writing-block or system disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Figure 1:
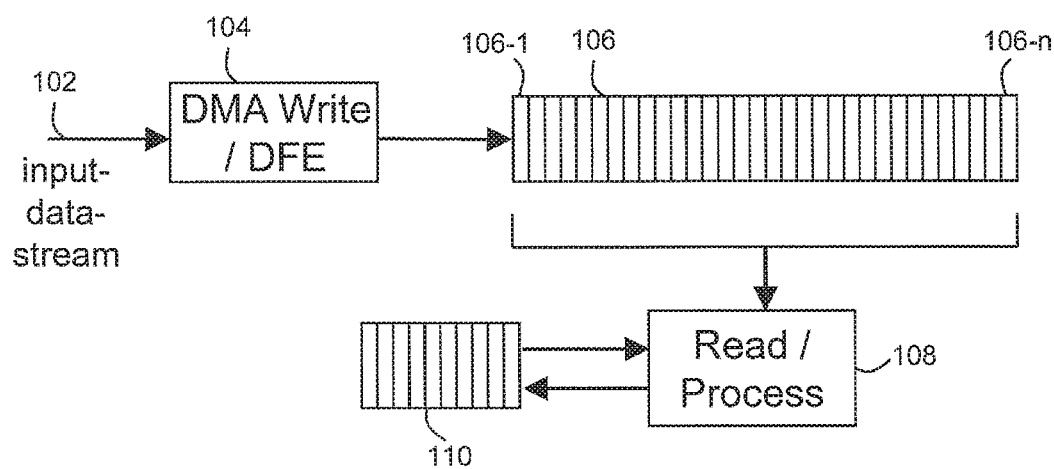
FIG. 1 illustrates schematically how a receiver can receive, store and process an input-data-stream.

FIG. 1 illustrates schematically how a receiver can receive, store and process an input-data-stream 102. The receiver may be a wireless receiver such as a wireless receiver operating to the IEEE 802.11 wireless networking standard. The receiver may also be an orthogonal frequency division multiplexing (OFDM) receiver. The receiver may be configured as part of a software defined radio (SDR) system or a digital-wireless-radio system. In line with the description below, the first step in a SDR system implementation can be a DFE hardware block writing received I/Q input-data-samples into a circular memory-buffer in a local digital signal processing (DSP) memory.

In this example, the receiver receives an input-data-stream 102 at a digital front end (DFE). The DFE comprises a writing-block 104 which receives the input-data-stream 102 and writes the input-data-stream 102 to a memory-buffer 106. A reading-block 108 can read input-data-symbols from the memory-buffer 106 and copy them to a second-memory-buffer 110, from where the input-data-symbols can be processed by the reading-block 108.

The input-data-stream 102 may comprise a continuous stream of input-data or may comprise discrete segments of input-data. For an OFDM receiver, the input-data-stream can comprise a range of subcarrier frequencies. The input-data-stream 102 comprises input-data-symbols, with each input-data-symbol comprising a plurality of input-data-samples. The input-data-samples may comprise in-phase (I) and quadrature (Q) components. For example, for IEEE 802.11 reception each input-data-symbol can comprise 80 input-data-samples.

The writing-block 104 writes the input-data-stream 102 to the memory-buffer 106. The memory-buffer 106 may be a digital memory access (DMA) buffer. The memory-buffer 106 comprises an ordered sequence of memory-elements 106-1-106-n. The writing-block 104 can write the input-data-stream 102 in a successive manner from a first-element 106-1 of the memory-buffer 106 to an end-element 106-n of the memory-buffer 106. In this example, the memory-buffer 106 is a circular-memory-buffer, such that when the writing-block 104 writes input-data to the end-element 106-n, the writing-block 104 continues to write the input-data in a successive manner restarting at the first-element 106-1. In this way, the circular-memory-buffer 106 is written in a looping process, successively from the first-element 106-1 to the end-element 106-n, before looping back to the first element 106-1. The looping process can continue repeatedly for as long as an input-data-stream 102 is received or the receiver is powered on.

The writing-block 104 does not determine the location of the symbol-boundaries in the input-data-stream 102 prior to writing the input-data-stream 102 to the memory-buffer 106. The first portion of the input-data-stream 102 received, and written to the memory-buffer 106, may not correspond to an input-data-symbol boundary; instead the first-element 106-1 of the memory-buffer 106 may store a sample from a middle portion of an input-data-symbol. When the writing-block 104 first begins receiving the input-data-stream 102, it may commence writing the input-data-stream to the memory-buffer 106 at the first element 106-1. Alternatively, the writing-block 104 may commence writing the input-data-stream 102 at an element other than the first-element 106-1. For example, the writing-block may commence writing at an element corresponding to a position at which a previous writing-session or input-data reception session terminated. Nonetheless, the writing-block writes the input-data-stream 102 in a successive manner from a first-element 106-1 to an end-element 106-n in a repeating looping process, regardless of the element at which writing commences.

As a consequence of: (i) the first-portion of the input-data-stream 102 not corresponding to an input-data-symbol boundary; and/or (ii) the variable element position at which writing commences, the boundaries of the memory-buffer 106 are unlikely to align with a symbol-boundary of the input-data-symbols of the input-data-stream 102. The writing-block does not determine the location of the symbol-boundaries in the input-data-stream 102.

Figure 2:
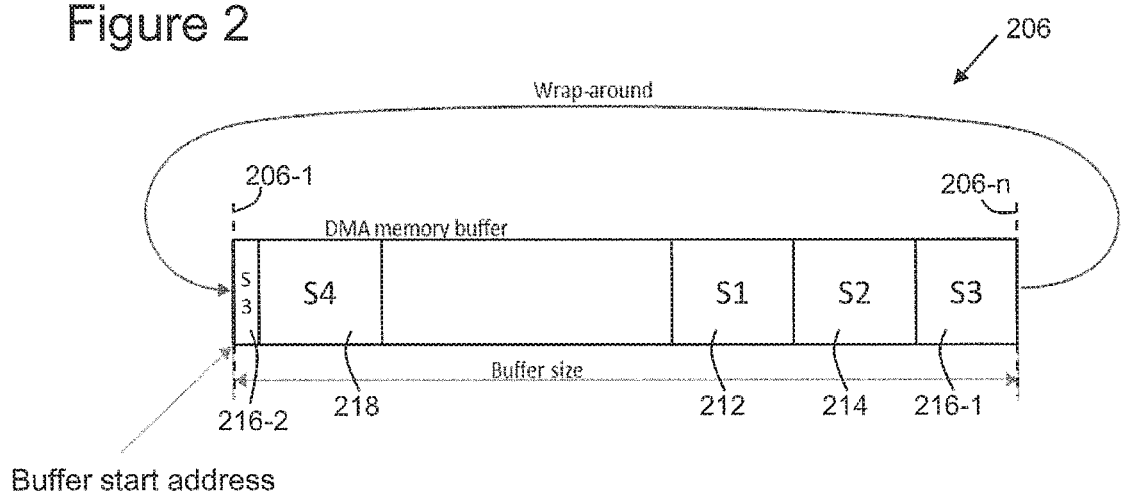
FIG. 2 illustrates a memory-buffer in which a writing-block has written an input-data-stream to the memory-buffer according to the schematic of FIG. 1.

FIG. 2 illustrates a memory-buffer 206, such as the memory-buffer of FIG. 1, in which a writing-block (not shown) has written an input-data-stream to the memory-buffer 206. The writing-block has written the input-data-stream to the memory-buffer 206 in a successive manner from the first-element 206-1 to the end-element 206-n of the memory-buffer 206. Following writing to the end-element 206-n, the writing-block has continued writing at the first element 206-1.

As a result of the successive nature of the writing process, the memory-buffer 206 comprises a plurality of input-data-symbols 212, 214, 216, 218. Each input-data-symbol occupies a plurality of memory elements. Each input-data-symbol is contiguous with immediately adjacent input-data-symbols. The writing-block has written a first-input-data-symbol 212 to the memory-buffer 206 beginning at an element between the first-element 206-1 and the end-element 206-n of the memory-buffer 206.

The first-input-data-symbol 212, a second-input-data-symbol 214 and a fourth-input-data-symbol 218 have each been written I stored in respective continuous pieces of the memory-buffer 206. That is all the input-data-samples in the respective input-data-symbol 212, 214, 218 have been written/stored in adjacent memory elements of a single range of memory-elements of the memory-buffer 206; there are no gaps between any of the input-data-samples of the respective input-data-symbol 212, 214, 218. In other words, the input-data-samples of the respective input-data-symbol 212, 214, 286 have been written in the order in which they were received to a closed range of adjacent memory bits of the memory-buffer.

The writing-block has written a third-input-data-symbol 216 starting at an element close to the end-element 206-n of the memory-buffer 206. Following writing of the end-element 206-n, the writing-block has continued to write the input-data-stream at the first-element 206-1. As a result, the third-input-data-symbol 216 is split into a third-symbol-first-segment 216-1 and a third-symbol-second-segment 216-2. In this way, the third-input-data-symbol 216 is not stored in a continuous piece of the memory-buffer 206. That is all the input-data-samples in the third-input-data-symbol 216 have not been written/stored in adjacent memory elements of a single range of memory-elements of the memory-buffer 206. A gap exists between the third-symbol-first-segment 216-1 and the third-symbol-second-segment 216-2. This gap comprises input-data-samples from input-data-symbols other than the third-input-data-symbol 216, in this example the first-, second- and fourth-input-data-symbols 212, 214, 218. In other words, the input-data-samples of the third-input-data-symbol 216 have not been written to a closed range of adjacent memory bits of the memory-buffer, but split into two distinct ranges of memory bits. As a result, the boundaries of the memory-buffer 206 do not align with the symbol-boundaries of the third-input-data-symbol 216 (or any other stored input-data-symbol).

Returning to FIG. 1, the reading-block 108 reads the input-data-stream 102 from the memory-buffer 106 for processing. The reading-block 108 may comprise digital signal processing (DSP) code for reading and processing the input-data-stream 102. The reading-block 108 can determine the symbol-boundaries of the input-data-symbols. For IEEE 802.11 reception, the DSP code repeatedly reads a number of input-data-symbols, each comprising 80 I/Q input-data-samples.

The DSP code can include a plurality of symbol processing steps. One or more symbol processing steps can operate more efficiently if the input-data-symbols are stored in a continuous piece of the memory-buffer 106. For example, processing an input-data-symbol will typically involve a fast Fourier transform (FFT) step. The FFT step can be more efficient for input-data-symbols stored in a continuous piece of memory.

As mentioned above, the symbol-boundaries of the input-data-stream 102 are typically not aligned with the boundaries of the memory-buffer 106. As a result, the reading-block 108 makes a copy of the input-data-symbol to a second-memory-buffer 110. The second-memory-buffer 110 may be located in the same local DSP memory as the memory-buffer 106. In this way, input-data-symbols can be stored in a continuous piece of memory in the second memory-buffer 110 in preparation for processing.

For example, when the reading-block 108 reads the end-element of the memory-buffer of FIG. 2, it will wrap-around and continue reading at the first-element of the memory-buffer. In this way, the reading-block can detect and read out the two separated segments of the third-input-data-symbol. The reading-block 108 can read out the third-input-data-symbol from the memory-buffer as the discontinuous third-symbol-first-segment 216-1 and third-symbol-second-segment 216-2 and stitch the two segments together into a continuous piece of the second-memory-buffer 110. In other words, the boundaries of the memory-buffer 106 are not aligned with the symbol-boundaries of the stored input-data-symbols and an input-data-symbol is split and stored into two separate memory locations. The reading-block therefore makes a copy of the input-data-symbol in the second-memory-buffer 110 before processing the symbol.

Figure 3:
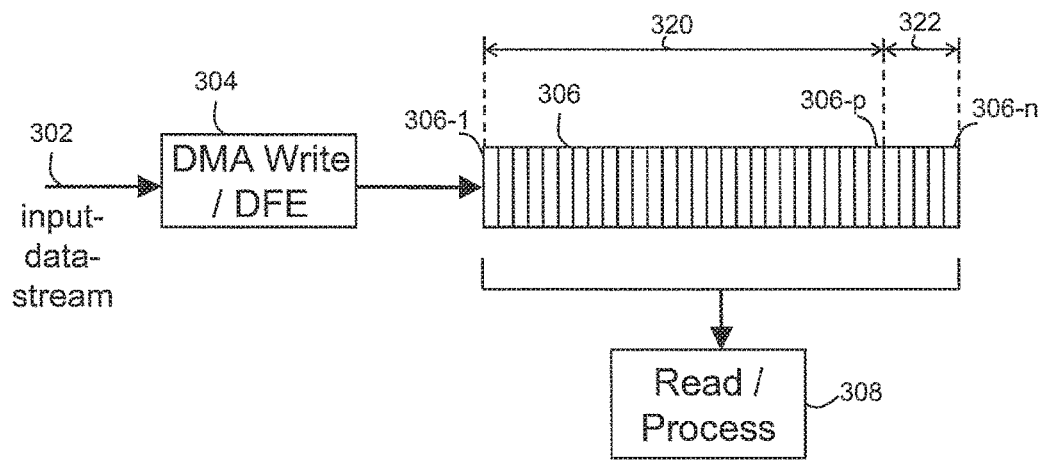
FIG. 3 illustrates schematically how a receiver can receive, store and process an input-data-stream according to an embodiment of the present disclosure.

FIG. 3 illustrates schematically how a receiver can receive, store and process an input-data-stream 302 according to an embodiment of the present disclosure. Features of FIG. 3 that are also shown in FIG. 1 have been given corresponding reference numbers in the 300 series and will not necessarily be described again here.

FIG. 3 illustrates an alternative way of storing the input-data-symbols in the DMA buffer, to that of FIG. 1. The writing-block 304 of the receiver is configured to write the input-data-stream 302 to the memory-buffer in such a manner that each input-data-symbol received can be stored in a continuous piece of the memory-buffer 306. As a result, the reading-block 308 can read the stored input-data-symbols from a continuous piece of the memory-buffer 306. Additionally, the reading-block 308 can process the input-data-symbols directly from the memory-buffer 306, which may be referred to as in-place processing. Advantageously, the receiver does not require a second-memory-buffer and the reading-block 308 does not have to make a copy of the input-data-symbols. This can save on component count/cost and processing time. In the receiver process illustrated by FIG. 1, copying the input-data-symbols costs extra DSP cycles of code. The process of FIG. 3 can advantageously provide a more optimal approach in which the DSP can process an input-data-symbol from a continuous piece of memory without having to use a second buffer.

In this example, the memory-buffer 306 is a circular memory-buffer comprising an ordered sequence of elements 306-1-306-n. The writing-block 304 is configured to write the input-data-stream 302 to the memory-buffer 306 in a successive manner from a first-element 306-1 of the ordered sequence to a predetermined-element 306-p of the ordered sequence. Following writing to the predetermined-element 306-p the writing-block 304 continues to write the input-data-stream 302 to the memory-buffer 306 in a successive manner restarting at the first-element 306-1. In response to writing the predetermined-element 306-p, the writing-block 304 also continues to write the input-data-stream 302 to the memory-buffer 306 in a successive manner from an element immediately following the predetermined element 306-p until a second predetermined-element 306-n of the memory-buffer 306. In this example, the second-predetermined element 306-n is the end element of the memory-buffer 306. In other examples, the second-predetermined element may be predetermined to be an element other than the end-element 306-n.

The elements of memory-buffer 306 between (and including) the first element 306-1 and the predetermined-element 306-p are termed the memory-buffer-core 320. The elements of memory-buffer 306 between (and including) the element following the predetermined-element 306-p and the second predetermined-element 306-n are termed the memory-buffer-supplement 322.

When the writing-block 304 writes to the predetermined-element 306-p, it continues to write the next portion of the input-data-stream 302 to both the first-element 306-1 and the element immediately following the predetermined element 306-p. This duplicated writing continues until the writing-block writes the input-data-stream 302 to the second-predetermined-element 306-n. At this stage the input-data contained in the memory-buffer-supplement 322 will be identical to an equivalently sized piece of memory starting at the first-element 306-1 of the memory-buffer-core 320. The size/capacity of the memory-buffer-supplement 322 is predetermined to be larger than or equal to the size of one input-data-symbol. In some embodiments, the size of the memory-buffer-supplement 322 can be equal to the size of one input-data-symbol. The size of one-input-data-symbol can be the minimum size that the memory-buffer-supplement 322 can take and still ensure each received input-data-symbol can be stored in a continuous piece of the memory-buffer 306. The size of the memory-buffer-core 320 can be predetermined according to the specific application to enable the desired processing. Predetermining the size of the memory-buffer-core and the memory-buffer-supplement 322 predetermines the position of the predetermined-element 306-p in the memory-buffer 306.

Following writing to the second-predetermined-element 306-n, the writing-block continues to write the input-data-stream to only the memory-buffer-core 320. The writing-block continues to write to only the memory-buffer-core 320 until it writes to the predetermined-element 306-p again.

The circular memory-buffer of FIG. 3 can be considered as an extended version of the buffer of FIG. 2; extended by the size of one input-data-symbol. The DMA writing-block 304 has also been adapted such that when the writing-block reaches the end of the memory-buffer-core 320 it continues to write the input-data-stream to the beginning of the memory-buffer and copy the same input-data to the extra memory (memory-buffer-supplement 322).

Figure 4:
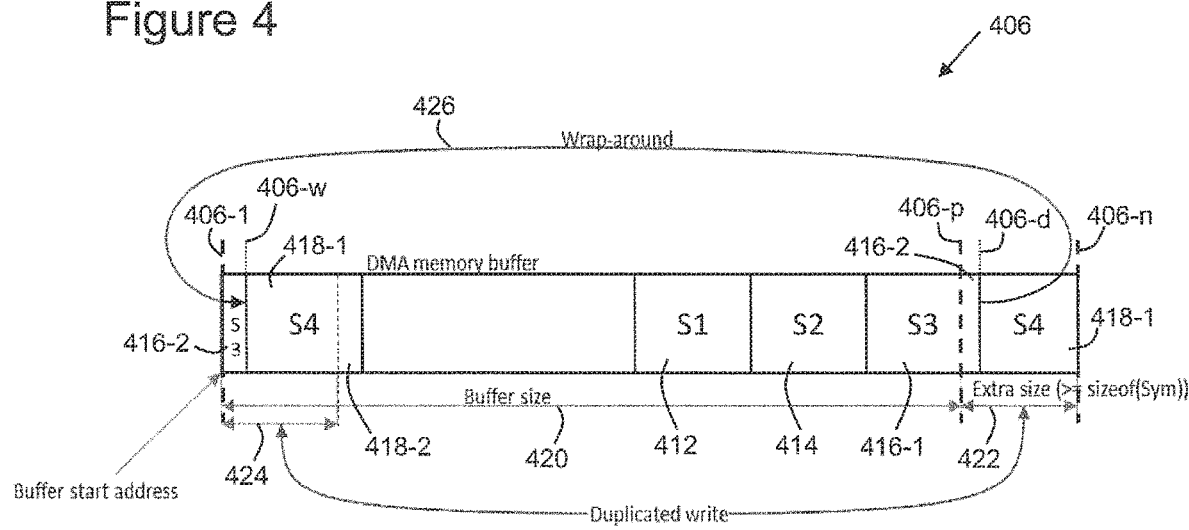
FIG. 4 illustrates a memory-buffer in which a writing-block has written an input-data-stream to the memory-buffer according to the schematic of FIG. 3.

FIG. 4 illustrates a memory-buffer 406 in which a writing-block (not shown), such as the writing-block of FIG. 3, has written an input-data-stream to the memory-buffer 406. Features of FIG. 4 that are also shown in FIGS. 1 to 3 have been given corresponding reference numbers in the 400 series and will not necessarily be described again here.

The writing-block has written the input-data-stream to the memory-buffer 406 in a successive manner from the first-element 406-1 to the predetermined-element 406-p of the memory-buffer 406. Following writing to the predetermined-element 406-p, the writing-block has continued writing the input-data-stream to both: (i) the first element 406-1; and (ii) the element immediately following the predetermined-element 406-p. In this way, the writing-block has duplicated a portion of the input-data-string. The duplicated portion of the input-data-stream is stored in both: (i) the memory-buffer-supplement 422; and (ii) an equivalently sized piece of memory 424 starting at the first-element 406-1 of the memory-buffer-core 420.

As a result of the writing process, the memory-buffer 406 comprises a plurality of input-data-symbols 412, 414, 416, 418. Each input-data-symbol is contiguous with immediately adjacent input-data-symbols. The writing-block has written a first-input-data-symbol 412 to the memory-buffer-core 420 beginning at an element between the first-element 406-1 and the predetermined-element 406-p. The writing-block has also written a second-input-data-symbol 414 to the memory-buffer-core 420 contiguous to and following the first-input-data-symbol 412.

The writing-block has written a third-input-data-symbol 416 contiguous to the second-input-data-symbol 414, beginning in the memory-buffer-core 420. The third-input-data-symbol 416 begins before the predetermined-element 406-p and finishes after the predetermined-element 406-p. Therefore, the writing-block has written to the predetermined-element 406-p during the writing of the third-input-data-symbol 416. Following writing to the predetermined-element 406-p, the writing-block has continued to write the third-input-data-symbol 416 to both: (i) the first element 406-1; and (ii) the element immediately following the predetermined-element 406-p. As a result, the writing-block has written a third-symbol-first-segment 416-1 to the memory-buffer-core 420 and a third-symbol-second-segment to both: (i) the memory-buffer-supplement 422; and (ii) the memory-buffer-core 420, beginning at the first element 406-1. In this way, the third-input-data-symbol 416 is stored in a continuous piece of the memory-buffer 406, formed from: (i) the third-symbol-first-segment 416-1 in the memory-buffer-core 420; and (ii) the third-symbol-second-segment 416-2 in the memory-buffer-supplement 422.

The writing-block has written a fourth-input-data-symbol 418 contiguous to the third-input-data-symbol 416. The writing-block has written a fourth-symbol-first-segment 418-1 to both the memory-buffer-supplement 422 and the memory-buffer-core 420. This is because following writing the predetermined-element 406-p, the duplicated writing continues until the writing-block writes the input-data-stream to the second-predetermined-element 406-n. The beginning of the fourth-symbol-first-segment 418-1 in the memory-buffer-supplement 422 is between the predetermined-element 406-p and the second-predetermined-element 406-n and is therefore written to both the memory-buffer-core 420 and the memory-buffer-supplement 422. Following writing to the second-predetermined-element 406-n, the writing-block continues to write the input-data-stream to only the memory-buffer-core 420. As a result, a fourth-symbol-second-segment 418-2 is only written to the memory-buffer-core 420 contiguous to the fourth-symbol-first-segment 418-1. In this way, the fourth-input-data-symbol 418 is stored in a continuous piece of the memory-buffer 406, formed from: (i) the fourth-symbol-first-segment 418-1 in the memory-buffer-core 420; and (ii) the fourth-symbol-second-segment 418-2 in the memory-buffer-core 420.

FIGS. 3 and 4 illustrate that the writing-block writes the input-data-stream to the memory-buffer in such a way that each input-data-symbol stored in the memory-buffer can be read out (at some time) from a continuous piece of the memory-buffer.

The reading-block of FIG. 3 can read out each input-data-symbol 412, 414, 416, 418 stored in the memory-buffer 406 from a continuous piece of the memory-buffer 406. In this way, the reading-block can advantageously process the input-data-symbols directly in the memory-buffer 406.

The reading-block can read-out and/or process the first-input-data-symbol 412 and the second-input-data-symbol 414 from continuous pieces of the memory-buffer 406 comprising the corresponding elements. The reading-block can read out and/or process the third-input-data-symbol 416 from the continuous piece of the memory-buffer 406 comprising the elements corresponding to: 0) the third-symbol-first-segment 416-1 in the memory-buffer-core 420; and (ii) the third-symbol-second-segment 416-2 in the memory-buffer-supplement 422.

In some examples, the reading-block can detect a symbol-boundary of an input-data-symbol in the memory-buffer-supplement 422 at a detected-boundary-element 406-d. In response, the reading-block may stop reading from the memory-buffer-supplement 422 and wrap-around 426 to commence reading from the memory-buffer-core 420. In this case, the reading-block commences reading in the memory-buffer-core 420 from a wrap-around element 406-w. The number of elements between the first-element 406-1 and the wrap-around-element 406-w corresponds to the number of elements between the predetermined-element 406-p and the detected-boundary-element 406-d. As can be seen in the Figure, the reading-block can detect the start of the fourth-input-data-symbol 418 in the memory-buffer-supplement 422 at the detected-boundary-element 406-d. The reading-block therefore wraps-around 426 to read the fourth-input-data-symbol 418 beginning at the wrap-around-element 406-w. In this way, the reading-block can read and process the fourth-input-data-symbol 418 from a continuous piece of the memory-buffer-core 420.

In some examples, the reading-block may detect that the fourth-input-data-symbol in the memory-buffer-supplement 422 is not a complete symbol and wrap-around 426 to read the fourth-input-data-symbol starting at the wrap-around-element 406-w.

In some examples, the reading-block may detect that the piece of memory-buffer from the detected-boundary-element 406-d to the second-predetermined-element 406-n is smaller than the size of an input-data-symbol, before wrap-around 426.

In some embodiments there may be additional memory elements preceding the first-memory-element 406-1. In some embodiments there may be additional memory-elements following the second-predetermined-element 406-n.

Applications of the disclosed writing-block include vehicle-to-everything (V2X) radios and other SDR based radios (DAB/DVB-T/etc.). The disclosed writing-block can reduce the number of DSP processing cycles per input-data-symbol, in a SDR system.

The writing-block disclosed herein can result in a load reduction and/or latency reduction when used in receiver systems, for example SDR radio or IEEE 802.11p receivers.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, Internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A writing-block for writing data to a memory-buffer, wherein the memory-buffer comprises an ordered sequence of elements and the writing-block is configured to:
   receive an input-data-stream; and
   write the input-data-stream to the memory-buffer in a successive manner from a first-element of the ordered sequence to a predetermined-element of the ordered sequence, wherein following writing to the predetermined-element the writing-block is configured to continue to write the input-data-stream to the memory-buffer in a successive manner restarting at the first-element;
   wherein in response to writing the predetermined-element, the writing-block is configured to also continue to write the input-data-stream to the memory-buffer in a successive manner from an element immediately following the predetermined element until a second predetermined-element of the memory-buffer.

2. The writing-block of claim 1 wherein following writing to the predetermined- element, the writing-block is configured to write the input-data-stream to both the first-element and the element immediately following the predetermined element in a duplicated-writing-process until the second-predetermined-element of the memory-buffer is written.

3. The writing-block of claim 1, wherein following writing to the second-predetermined-element, the writing-block is configured to continue to write the input-data-stream to only a memory-buffer-core, defined as the elements between the first-element and the predetermined element, until it writes to the predetermined-element again.

4. The writing-block of claim 1 wherein a memory-buffer-supplement defined as the elements between the element immediately following the predetermined element and the second predetermined-element is larger than or equal to a symbol-size of one input-data-symbol of the input-data-stream.

5. The writing-block of claim 1 wherein each input-data-symbol of the input-data-stream is stored in a continuous piece of the memory-buffer.

6. A system comprising:
   a memory-buffer comprising an ordered sequence of elements; and
   a writing-block for writing data to the memory-buffer, the writing-block is configured to:
      receive an input-data-stream; and
      write the input-data-stream to the memory-buffer in a successive manner from a first-element of the ordered sequence to a predetermined-element of the ordered sequence, wherein following writing to the predetermined-element the writing-block is configured to continue to write the input-data-stream to the memory-buffer in a successive manner restarting at the first-element;
      wherein in response to writing the predetermined-element, the writing-block is configured to also continue to write the input-data-stream to the memory-buffer in a successive manner from an element immediately following the predetermined element until a second predetermined-element of the memory-buffer.

7. The system of claim 6 further comprising a reading-block configured to read the input-data-symbols of the input-data-stream from the memory-buffer.

8. The system of claim 7 wherein the reading-block is configured to read input-data-symbols of the input-data-stream from a continuous piece of the memory-buffer.

9. The system of claim 6 wherein, a memory-buffer-supplement is defined as the elements between the element immediately following the predetermined element and the second predetermined-element, and the reading-block is further configured to:
- detect the start of a new-input-data-symbol in the memory-buffer-supplement at a detected-boundary-element; and
- locate another copy of the new-input-data-symbol at a wrap-around-element in a memory-buffer-core, wherein the memory-buffer-core is defined as the elements between the first-element and the predetermined-element.

10. The system of claim 9 wherein the reading-block is configured to determine the number of elements between the first-element and the wrap-around-element as equal to the number of elements between the predetermined-element and the detected-boundary-element.

11. The system of claim 6 wherein the reading-block comprises digital signal processing code and is configured to process the input-data-symbols of the input-data-stream directly in the memory-buffer.

12. The system of claim 11 wherein the processing code comprises a fast Fourier transform routine.

13. The system of claim 6, wherein following writing to the predetermined-element, the writing-block is configured to write the input-data-stream to both the first-element and the element immediately following the predetermined element in a duplicated-writing-process until the second-predetermined-element of the memory-buffer is written.

14. The system of claim 6, wherein following writing to the second-predetermined-element, the writing-block is configured to continue to write the input-data-stream to only a memory-buffer-core, defined as the elements between the first-element and the predetermined element, until it writes to the predetermined-element again.

15. The system of claim 6, wherein a memory-buffer-supplement, defined as the elements between the element immediately following the predetermined element and the second predetermined-element, is larger than or equal to a symbol-size of one input-data-symbol of the input-data-stream.

16. The system of claim 6, wherein each input-data-symbol of the input-data-stream is stored in a continuous piece of the memory-buffer.

17. A method for writing data to a memory-buffer comprising an ordered sequence of elements, the method comprising the steps of:
- receiving an input-data-stream;
- writing the input-data-stream to the memory-buffer in a successive manner from a first-element of the ordered sequence to a predetermined-element of the ordered sequence;
- following writing to the predetermined-element, writing the input-data-stream to the memory-buffer in a successive manner restarting at the first-element; and
- in response to writing the predetermined-element, writing the input-data-stream to the memory-buffer in a successive manner from an element immediately following the predetermined element until a second predetermined-element of the memory-buffer.

18. The method of claim 17, further comprising writing the input-data-stream to both the first-element and the element immediately following the predetermined element in a duplicated-writing-process until the second-predetermined-element of the memory-buffer is written.

19. The method of claim 17, further comprising continuing to write the input-data-stream to only a memory-buffer-core, defined as the elements between the first-element and the predetermined element, until it writes to the predetermined-element again.

20. The method of claim 17, further comprising storing each input-data-symbol of the input-data-stream in a continuous piece of the memory-buffer.

* * * * *